(12) United States Patent
Fedan

(10) Patent No.: US 10,958,087 B2
(45) Date of Patent: Mar. 23, 2021

(54) BATTERY PROTECTION SYSTEM

(71) Applicant: Orest Fedan, Hyde Park, MA (US)

(72) Inventor: Orest Fedan, Hyde Park, MA (US)

(*) Notice: Subject to any disclaimer, the term of this patent is extended or adjusted under 35 U.S.C. 154(b) by 355 days.

(21) Appl. No.: 16/041,767

(22) Filed: Jul. 21, 2018

(65) Prior Publication Data

US 2020/0028370 A1 Jan. 23, 2020

(51) Int. Cl.
*H02J 7/00* (2006.01)
*H02J 7/04* (2006.01)

(52) U.S. Cl.
CPC ............ *H02J 7/0031* (2013.01); *H02J 7/008* (2013.01); *H02J 7/045* (2013.01); *H02J 7/0068* (2013.01); *H02J 7/00302* (2020.01); *H02J 7/00306* (2020.01)

(58) Field of Classification Search
CPC ...... H02J 7/0029; H02J 7/0031; H02J 7/0036; H02J 7/0063; H02J 7/007; H02H 7/18; H02H 1/0007
See application file for complete search history.

(56) References Cited

U.S. PATENT DOCUMENTS

| | | | |
|---|---|---|---|
| 5,225,762 A | 7/1993 | Langford | |
| 5,498,949 A * | 3/1996 | Dowe | H02J 7/0031 320/128 |
| 5,948,949 A * | 9/1999 | Takagawa | C07C 7/14 585/817 |
| 6,104,220 A | 8/2000 | Ciccone | |
| 6,969,974 B1 | 11/2005 | Liu | |
| 7,177,691 B2 | 2/2007 | Meadows | |
| 7,440,249 B2 | 10/2008 | Sheng | |
| 7,525,291 B1 * | 4/2009 | Ferguson | H02J 7/045 320/164 |
| 7,737,665 B2 | 6/2010 | Grewe | |
| 8,022,671 B2 | 9/2011 | Chueh | |
| 8,154,248 B2 | 4/2012 | Cruise | |
| 9,768,630 B2 | 9/2017 | Yan | |
| 9,843,204 B2 | 12/2017 | Kadirvel | |
| 9,855,438 B2 | 1/2018 | Parramon | |
| 9,871,390 B2 | 1/2018 | Wu | |
| 9,917,466 B2 | 3/2018 | Wagner | |
| 9,954,215 B2 | 4/2018 | Pevear | |
| 9,991,729 B2 | 6/2018 | Hung | |
| 10,003,891 B2 | 6/2018 | Siegumfeldt | |
| 2013/0049675 A1 * | 2/2013 | Minami | G06F 1/266 320/103 |

* cited by examiner

*Primary Examiner* — Kyle J Moody
*Assistant Examiner* — Lakaisha Jackson
(74) *Attorney, Agent, or Firm* — Iandiorio Teska & Coleman, LLP; Kirk Teska

(57) ABSTRACT

A battery protection system with a voltage sensing circuit for sensing the voltage of a battery and disconnecting all loads from the battery, including the voltage sensing circuit itself, when the voltage of the battery drops below a preset limit or when a battery charger is connected to the battery. The battery protection system reconnects the voltage sensing circuit upon disconnection of the battery charger.

8 Claims, 2 Drawing Sheets

BATTERY PROTECTION SYSTEM

BACKGROUND

Field of Invention

This invention pertains in general to protection circuits for batteries, and, more particularly, in one example to protection circuits for lithium polymer batteries.

Description of Prior Art

Examples of battery protection circuits include voltage supervisory integrated circuits and battery charging integrated circuits. A voltage supervisory integrated circuit (IC) monitors the voltage of a battery and disconnects it from other circuits to prevent the battery from discharging too much. Discharging a battery can damage some batteries. An over-discharged battery also supplies a much reduced voltage to the circuitry to which it is connected. Some circuits can be damaged if operated at too low a voltage. Circuits powered by a battery may also function erratically when the voltage supplied by the battery is too low. A voltage supervisory IC prevents such erratic operation by disconnecting the battery when its voltage drops to too low a value. Battery charging integrated circuits must also disconnect the battery being charged from all other circuitry during the charging of the battery. If the battery is not disconnected from other circuitry while being charged, the battery charging IC will not be able to discriminate between current drawn by the battery being charged and current drawn by the circuitry connected to the battery. A battery charging IC must know the current being drawn by the battery in order to charge it correctly. This prevents the battery from being over charged. Battery chargers keep charging until the current drawn by the battery drops below a preset level. If the battery charger has to supply current to other circuitry in addition to the battery itself, it will over charge the battery because it will take longer for the total current to drop below the preset level. In fact, the total current may never drop below the preset level depending on the current drawn by the other circuitry. This would greatly over charge the battery. Over charging a battery damages the battery. A damaged battery (whether the damage was caused by over charging or by allowing the voltage to drop too low) can catch fire during the charging operation. This is especially true for lithium polymer batteries. U.S. Pat. No. 7,737,665 (incorporated herein by this reference) describes a battery charger which monitors the current usage of devices connected to the battery without disconnecting the devices during charging. Subtracting this current usage from the current supplied by the battery charger yields an accurate representation of the current supplied to the battery.

Lithium polymer batteries, are particularly sensitive to over-discharging. Damage to such batteries begins when their voltage is allowed to drop below 3.0V (volts) and the amount of damage to the battery increases as the voltage of the battery decreases. The normal operating voltage range of such batteries is from 3.0V to 4.2V. In order to get the most usage of the battery, it is desirable to let the battery discharge as close to 3.0V as possible but never below 3.0V. A very accurate voltage sensing circuit is required in order to achieve this. U.S. Pat. No. 9,871,390 (incorporated herein by this reference) describes such a very accurate voltage sensing circuit. Accurate voltage sensing circuits draw more current from the voltage being measured. If an accurate voltage sensing circuit is directly connected to a battery, it will continue to discharge the battery even if all other circuitry is disconnected from the battery. If the accurate voltage sensing circuit is disconnected from the battery when a too low voltage condition is sensed, then it will not be able to sense when the battery voltage is once again increased after being charged by an externally applied battery charger.

Both voltage supervisory ICs and battery charging ICs must have absolute minimum leakage current drawn from the battery when the battery is disconnected and not being charged. Otherwise, the battery will continue to discharge to supply the leakage current, thus negating the benefits provided by the voltage supervisory and battery charging ICs.

While dedicated battery charging ICs such as those discussed in U.S. Pat. Nos. 9,768,630 and 9,843,204 (both incorporated herein by this reference) have circuitry which prevents the battery voltage from dropping below 3.0V, it is undesirable to include a battery charging IC in inexpensive battery powered devices to keep the cost of the devices as low as possible. Also, other circuitry is still required to disconnect the battery during battery charging.

While voltage supervisory ICs exist, such as those discussed in U.S. Pat. Nos. 8,022,671 and 8,154,248 (both incorporated herein by this reference), they are generally expensive and they require space to reside on a printed circuit board. It is advantageous, therefore, to have a circuit which is as small as possible and as inexpensive as possible and performs a voltage supervisory function in battery powered devices. U.S. Pat. No. 7,440,249 (incorporated herein by this reference) describes a voltage supervisory circuit which is very small and inexpensive. However, other circuitry is still required to disconnect the battery during charging or upon detection of a low battery voltage, as well as reconnecting the battery after charging is completed. U.S. Pat. No. 6,104,220 (incorporated herein by this reference) describes a voltage supervisory circuit which is not only small and inexpensive, it is also fast and draws very little current. However, it is not accurate enough to be used for protecting lithium polymer batteries.

BRIEF SUMMARY OF THE INVENTION

The present invention describes a battery protection circuit which performs an accurate voltage supervisory function in battery powered devices using only a few inexpensive components. Such a circuit could be constructed on a printed circuit board (pcb) with discrete components requiring very little pcb area. The circuit could also be integrated into an integrated circuit (IC) requiring even less pcb area.

When the battery voltage drops below 3.1V, the battery protection circuit of the present invention disconnects all circuitry, including its voltage sensing circuitry, from the battery, thus keeping leakage from the battery to an absolute minimum.

When the battery is being charged (regardless of the voltage of the battery), the battery protection circuit of the present invention again disconnects all circuitry, including its voltage sensing circuitry, from the battery, thus allowing the battery charger to precisely measure only the current being drawn by the battery during charging.

The battery protection circuit of the present invention senses the application and removal of an external battery charger by using a capacitor instead of a direct connection. A direct connection to the battery would contribute to the leakage current drawn from the battery. But by using a capacitor, the voltage transitions caused by application and removal of the battery charger can be sensed with no DC (direct current) leakage. The voltage transitions discharge (or charge) the capacitor, thus passing a current for a short time through the capacitor to the voltage sensing circuitry allowing the circuitry to sense the application (or removal) of the battery charger. But these transient currents quickly die away when the capacitor becomes fully discharged (or fully charged), thus contributing zero leakage from the battery.

The battery protection system of this invention includes a battery charger having a positive terminal, negative terminal and a control terminal. The battery charger outputs a connection signal on the control terminal. The connection signal is an electrical connection between the control terminal and the negative terminal. A USB cable connects these terminals to a USB jack which has a power terminal, ground terminal and control terminal. The positive terminal of the battery charger connects to the power terminal of the jack which also connects to a rechargeable battery and to the input terminal of a protection circuit. The negative terminal of the battery charger connects to the negative terminal of the jack which also connects to circuit ground. The control terminal of the battery charger connects to the control terminal of the jack and then to the sense terminal of a pulse generator. The pulse generator, using a capacitor, provides a transitory discharge current when it receives the connection signal from the jack control terminal and provides a transitory charge current when it stops receiving the connection signal (when the battery charger is disconnected). The battery protection system also includes an output terminal which provides an output voltage and a voltage comparator which compares the output voltage to a preset limit and outputs the comparison. An electronic switch in the battery protection system is responsive to the charge current, the discharge current and the voltage comparator output and is configured to connect the input terminal (and therefore the rechargeable battery) to the output terminal when the charge current is present and to disconnect the input terminal from the output terminal when the discharge current is present or when the output voltage drops below the preset limit.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

The present invention is directed to a battery protection circuit and a method thereof using the example of an under-voltage protection circuit. Under-voltage protection circuits are only one type of battery protection circuits. Other battery protection circuits include, but are not limited to, those in this document. It is understood that their use in the description is intended to demonstrate the present subject matter, but not in a limited or exclusive or exhaustive sense. The under-voltage protection circuit includes a voltage sensing circuit, a switch for disconnecting all circuitry (including the voltage sensing circuit) from a battery when the voltage sensing circuit determines that the battery voltage is too low, and a charger sensing circuit. The charger sensing circuit senses when a battery charger is connected to (or removed from) the battery.

Figure 1:
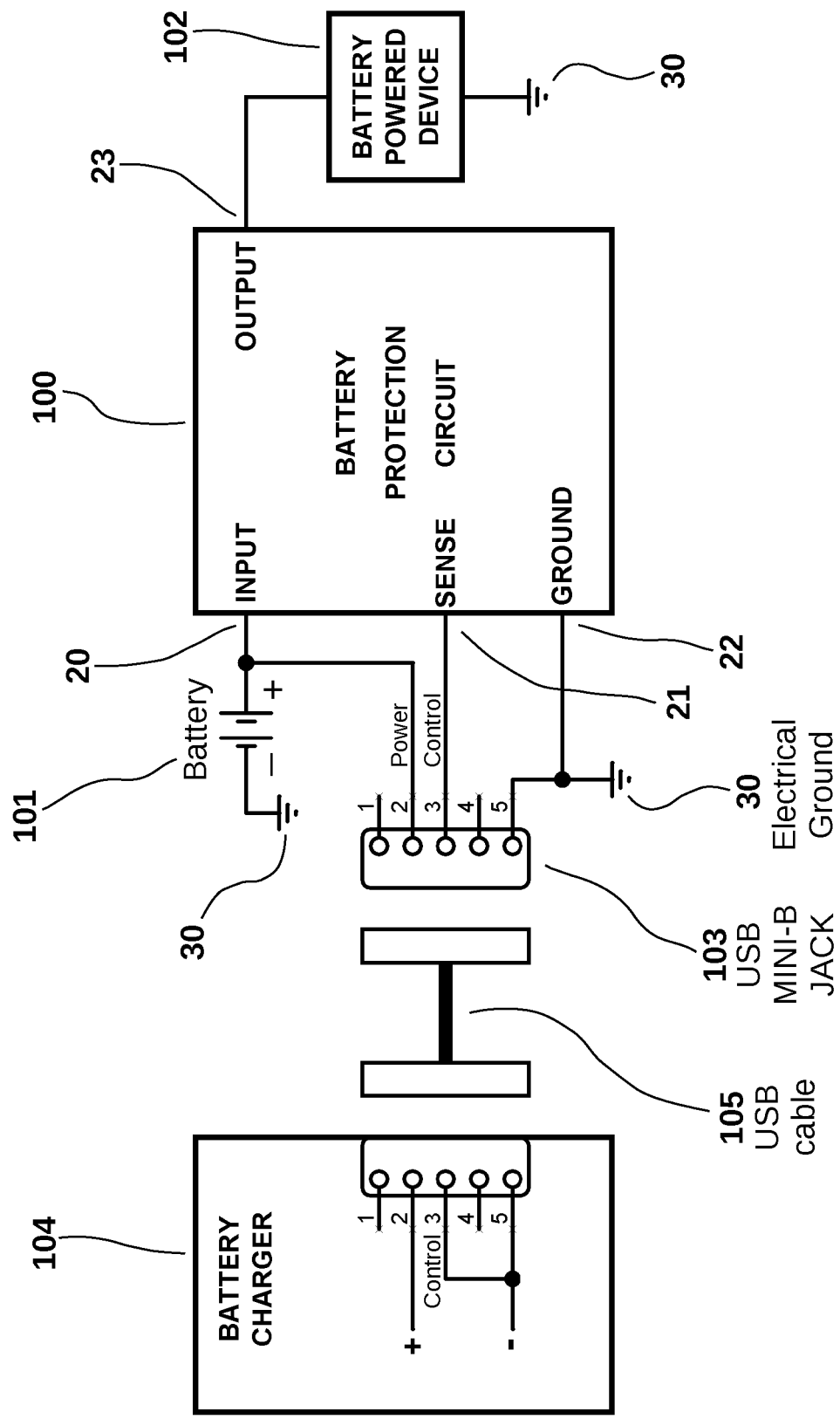
FIG. 1 depicts an embodiment of a battery protection circuit of the present invention.

FIG. 1 depicts an embodiment of a battery protection circuit 100 of the present invention including a single cell lithium polymer rechargeable battery 101 with its negative terminal connected to electrical ground 30 and its positive terminal connected to the input terminal 20 of the battery protection circuit 100 and a battery powered device 102 (for example, a receiver or transmitter of a hearing aid) which is to receive power from the battery, with its negative terminal connected to ground 30 and its positive terminal connected to the output terminal 23 of the battery protection circuit 100. In FIG. 1, the battery protection circuit also has a ground terminal 22 connected to electrical ground 30 and a sense terminal 21. The sense terminal is designed to sense the application (and removal) of a battery charger.

A common and convenient means for connecting a battery charger having a positive terminal and a negative terminal is by using a USB type connector jack. In this case a MINI-B USB type of jack 103 is used because it is common and very small, but other type connectors can be used. A MINI-B USB jack has 5 pins. Normally, according to the USB standard, pin 1 is used to supply +5V to circuits and pin 5 is connected to electrical ground. In the present invention, pin 5 connects the negative terminal of the battery charger to electrical ground but pin 1 is not used (not connected to). If a device with a USB cable conforming to the USB standard is ever plugged into jack 103, it would supply +5V to pin 1 and this is too high a voltage for charging a single cell lithium polymer battery. Pins 2 and 3 of jack 103, according to the USB standard are for providing data communications. But in the embodiment of FIG. 1, pin 2 is used as a power terminal to supply power from the positive terminal of the battery charger to battery 101 and pin 3 is used as a control terminal to provide a connection signal to sense terminal 21. The connection signal communicates to the sense terminal when a battery charger 104 is connected to jack 103 via USB cable 105. In the present embodiment, the connection signal is a connection to electrical ground 30 (an electrical connection of pin 3 of jack 103 to pin 5 of jack 103). But any other form of connection signal can also be used. The connection of pin 3 to pin 5 of jack 103 can be enacted either in the USB cable 105 or in the battery charger 104. It can be enacted with a direct connection or using a transistor. In the present embodiment, a direct connection in the battery charger is used (as shown in FIG. 1). In this way, whenever battery charger 104 is connected to jack 103 via USB cable 105, the battery charger outputs a connection signal to sense terminal 21 of the battery protection circuit 100 by connecting the sense terminal 21 to ground (and the sense terminal will be floating whenever the battery charger is not connected).

Output terminal 23 is connected to input terminal 20 by means of an electronic switch in battery protection circuit 100. This switch will be opened whenever battery charger 104 is connected to jack 103, and it will be closed upon disconnection of the battery charger from jack 103.

Figure 2:
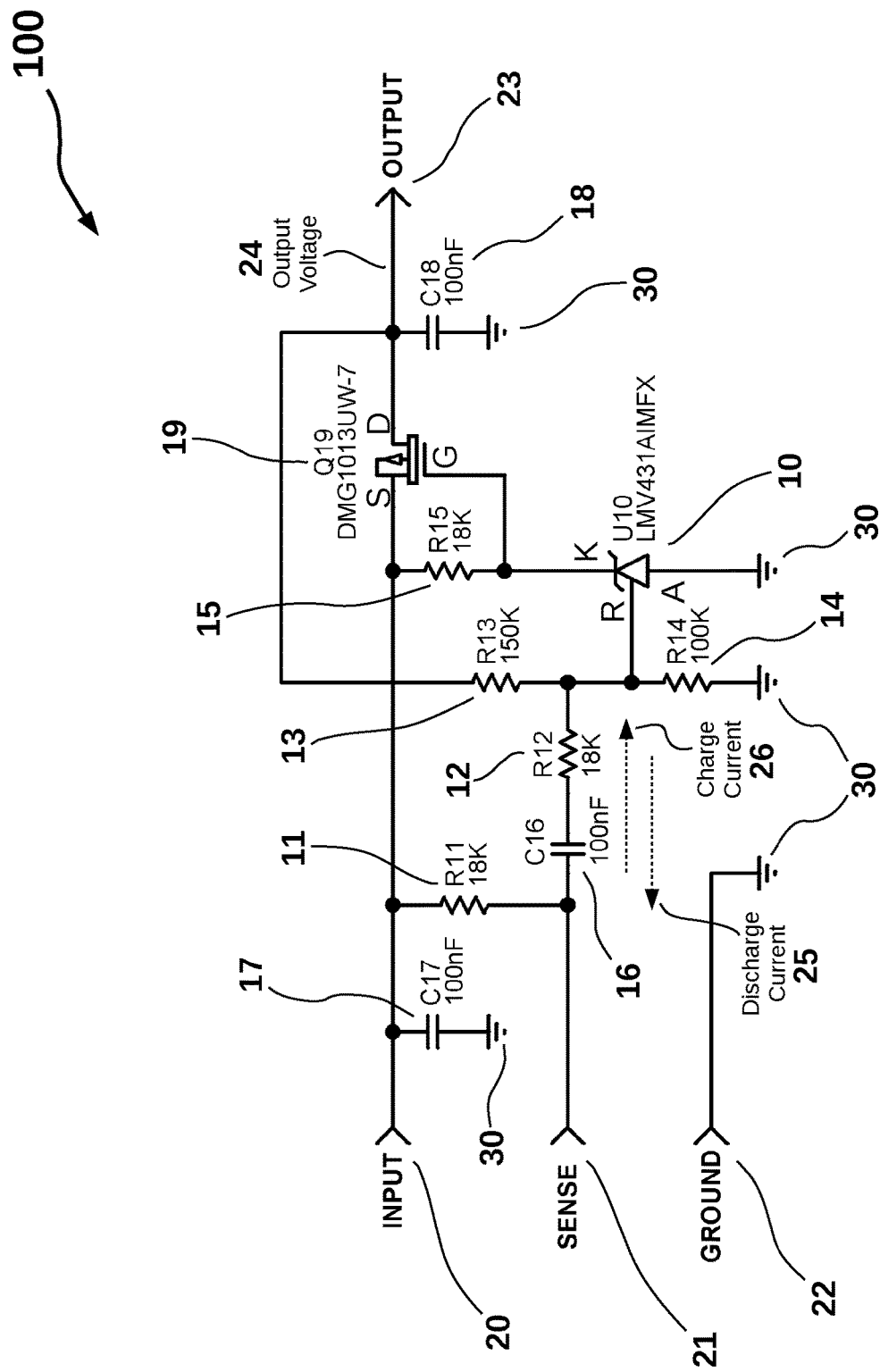
FIG. 2 illustrates a schematic view showing one embodiment of the present invention realized in a discrete circuit form.

FIG. 2 illustrates a schematic view showing an embodiment of an under-voltage lithium polymer battery protection circuit 100 of the present invention realized in a discrete circuit form. Input terminal 20 is connected to capacitor 17, which is connected to circuit ground 30. Input terminal 20 is also connected to resistor 11, which is connected to sense terminal 21 and capacitor 16. Capacitor 16, serving as a pulse generator, is connected to resistor 12. Input terminal 20 is also connected to resistor 15 and the source (S) terminal of electronic switch 19 (for example, a metal oxide semiconductor transistor). Resistor 15 is connected to the gate (G) terminal of switch 19 and the cathode (K) of shunt voltage regulator 10. Output terminal 23 is connected to capacitor 18, which is connected to ground 30. Output terminal 23 is also connected to the drain (D) terminal of electronic switch 19, and resistor 13, which is connected to resistor 12, resistor 14, and the reference (R) of shunt voltage regulator 10. Ground terminal 22 connects to circuit ground 30, which connects to resistor 14 and the anode (A) of shunt voltage regulator 10. The shunt voltage regulator acts as a voltage comparator.

The positive terminal of a lithium polymer battery is connected to input terminal 20. Normally, when the battery is charged, switch 19 is closed (S connected to D), thus connecting the positive terminal of the battery to output terminal 23 and providing an output voltage 24 to output terminal 23 and providing power to any battery powered device which is connected to terminal 23. Switch 19 may be a low leakage P-channel MOSFET, (metal oxide semiconductor transistor) such as a Diodes Inc. part number DMG1013UW-7, which is kept ON (S connected to D) by a low voltage at its gate (G). The voltage is kept low by shunt voltage regulator 10 being ON (drawing current), causing a voltage drop across resistor 15. Shunt voltage regulator 10 will remain ON provided that the voltage at its reference (R) remains above a preset value. For a shunt voltage regulator such as Texas Instruments part number LMV431AIMFX, that preset value is 1.24V. The voltage at its reference is determined by the output voltage 24 at terminal 23 and the voltage divider ratio of resistors 13 and 14. With the resistor values shown in FIG. 2, the voltage divider ratio is such that the voltage at the reference of the shunt voltage regulator equals the preset value of 1.24V when the output voltage 24 at terminal 23 is 3.10V. If the output voltage 24 at terminal 23 drops below this value, shunt voltage regulator 10 will turn OFF (stop drawing current) and the voltage at the gate of switch 19 will rise to approximately the same value as the voltage at the source (S) of the switch. This will turn OFF switch 19 (disconnect S from D). The battery will then only need to provide the leakage current through switch 19 and shunt voltage regulator 10. This leakage current is very small and the battery can provide it for a long time without dropping below 3.00V. In order to set the turn off voltage very accurately to 3.10V, relatively low value resistors are required in the voltage divider composed of resistors 13 and 14. Such low values would quickly deplete the battery if they remained connected across the battery after switch 19 turns OFF. But because they are connected to the output (D) of the switch, they are disconnected from the battery when switch 19 turns OFF.

Switch 19 should also be turned OFF (regardless of the voltage of the battery) whenever a battery charger is charging the battery because the battery charger must only measure the current drawn by the battery. This is accomplished by pulling the voltage at terminal 21 to ground when the battery charger is connected. With no battery charger connected, this voltage is pulled up to the voltage of the battery by resistor 11. When the voltage is pulled to ground by connecting the battery charger, capacitor 16 discharges, pulling a discharge current 25 through resistor 12 away from the reference (R) of shunt voltage regulator 10 long enough to turn it OFF, thus turning OFF switch 19. The switch stays OFF even after capacitor 16 is fully discharged (and no longer pulls current away from the reference (R) of the shunt voltage regulator) because the voltage at terminal 23 falls to 0V after switch 19 turns OFF, thus keeping the voltage at the reference (R) of the shunt voltage regulator 10 below the preset value.

When the battery is fully charged and the battery charger is disconnected, sense terminal 21 becomes floating and resistor 11 starts charging capacitor 16. This pushes a charge current 26 through resistor 12 into the reference terminal (R) of shunt voltage regulator 10 long enough to turn it ON. When the shunt voltage regulator is ON, it draws current through resistor 15 dropping the voltage at the gate of switch 19, thus turning it ON. Once the switch is ON, the voltage at terminal 23 rises to the voltage of the charged battery, and the resistor divider composed of resistors 13 and 14 keeps the shunt voltage regulator ON even after capacitor 16 becomes fully charged and stops supplying current through resistor 12. Capacitors 17 and 18 absorb induced transients, ensuring reliable turning ON and OFF of switch 19. The shunt voltage regulator 10 can be replaced by any type of voltage comparator with a voltage reference.

In FIG. 1, USB cable 105 can be replaced with a different type of cable. Jack 103 can be replaced with a different type of jack and different pins can be used than those illustrated in the preferred embodiment.

The under-voltage protection circuit illustrated in FIGS. 1 and 2 can be extended to protect from over voltages as well. Also, by modification of voltage levels, other types of batteries or stacks of batteries can be protected which have different operating voltages.

The examples illustrated of the discrete embodiments of the present invention can be incorporated into an integrated circuit, reducing size and cost even more. Because the discrete circuits use so few and such simple components, an integrated circuit form would require very little die area and thus be very inexpensive.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A battery protection system including:
an input terminal,
a ground terminal,
an output terminal configured to provide an output voltage,
a capacitor having a first terminal and a second terminal,
a resistor connected to said input terminal and said first terminal of said capacitor and accepting an input cur- rent from said input terminal, and providing a charge current to said first terminal of said capacitor, thereby charging said capacitor, a sense terminal connected to said resistor and said first terminal of said capacitor and configured, when an electrical sense connection is made to said sense terminal, to divert said charge current away from said capacitor and to provide a discharge current to said capacitor, thereby discharging said capacitor, a regulator having an input connected to said second terminal of said capacitor and responsive to said charge current and said discharge current and configured to measure said output voltage, an electronic switch configured to make an electrical connection between said input terminal and said output terminal and responsive to said regulator, wherein said electronic switch is configured to break said electrical connection between said input terminal and said output terminal when said output voltage drops below a preset limit or when said capacitor is discharging, and to make said electrical connection between said input terminal and said output terminal upon loss of said electrical sense connection to said sense terminal, and wherein said resistor is configured to not accept said input current from said input terminal if said capacitor is fully charged and said electrical sense connection is broken.

2. The system of claim 1 wherein said electronic switch is a metal oxide semiconductor transistor.

3. The system of claim 1 further including a rechargeable battery.

4. The system of claim 3 wherein said rechargeable battery is a lithium polymer type.

5. The system of claim 3 wherein said input terminal is connected to said rechargeable battery.

6. The system of claim 1 further comprising: a jack including:
a power terminal connected to said input terminal, and a control terminal connected to said sense terminal.

7. The system of claim 6 further including a battery charger connected to said jack and outputting said discharge current on said control terminal.

8. The system of claim 6 wherein said jack is a USB type connector.

* * * * *